A. F. Jalonneau,
Making Water Pipes.
No. 1,407. Reissued Feb. 10, 1863.
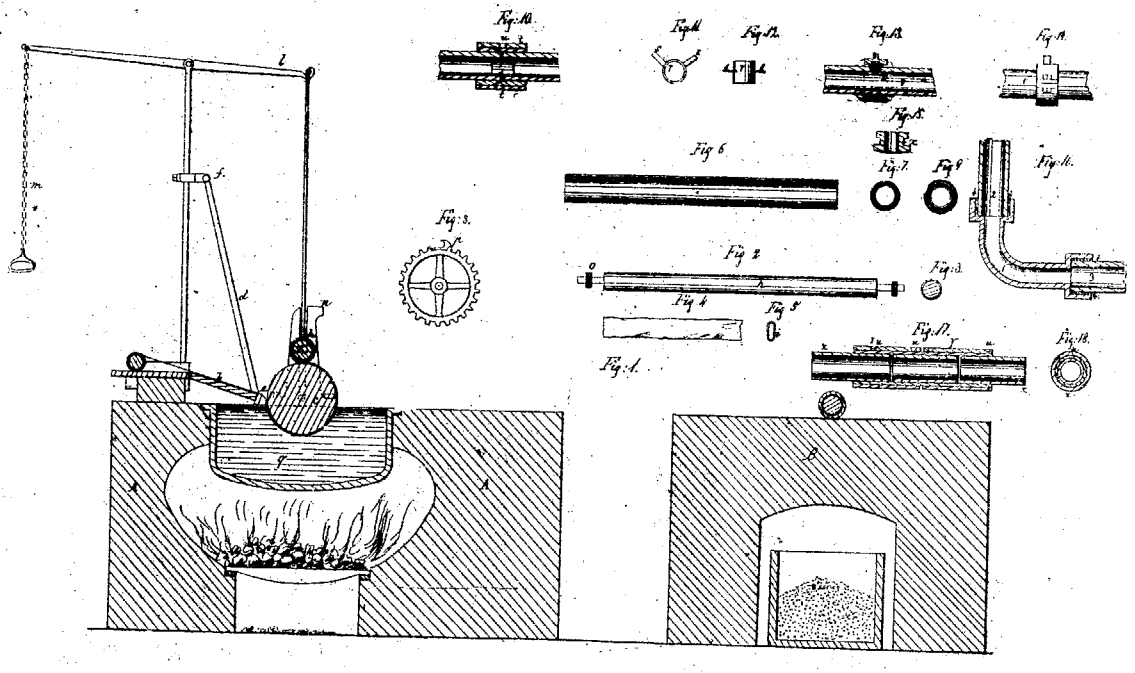
Witnesses.
Inventor:
Alph. Jalonneau
by W. Hudson

UNITED STATES PATENT OFFICE.

THURLOW WEED AND PHILO S. SHELTON, OF ALBANY, NEW YORK, ASSIGNEES OF ALFRED FAUVIN JALOUREAU, OF PARIS, FRANCE.

IMPROVED WATER AND AIR PROOF PIPE FROM BITUMINOUS CEMENT.

Specification forming part of Letters Patent No. 24,125, dated May 24, 1859; antedated December 30, 1857; Reissue No. 1,407, dated February 10, 1863.

*To all whom it may concern:*

Be it known that ALFRED FAUVIN JALOUREAU, of Paris, in the Empire of France, has invented a new Manufacture of Pipes or Tubes Impervious to Water and Air, of which the following is a full, clear, and exact description.

The said invention of the said ALFRED FAUVIN JALOUREAU consists of a new manufacture of pipes or tubes for many of the purposes for which metal pipes or tubes have heretofore been used, the said new manufacture of pipes or tubes being composed of several thicknesses of paper or other tissue rolled up with bituminous mastic interposed between and uniting the several windings or thicknesses of the paper or other tissue.

It is well known that metallic pipes for conducting water and gas under ground and in buildings, and for sewerage and many other purposes, are seriously objectionable on account of their great weight and cost, but principally because they are soon deteriorated by oxidation, and when made of lead the oxides are deleterious. Many other objections might be enumerated, but they are so well known that it is deemed unnecessary.

Many attempts have been made to produce pipes and tubes of other substances to avoid the defects of metallic pipes, but without success until the said invention of the said A. F. JALOUREAU. The pipes so constituted are much cheaper and lighter than metal pipes. They are not affected by the atmosphere or moisture, or the fluids or gases which are usually conveyed in pipes. They will not be attacked by vermin of any kind, and as they are non-conductors of electricity and magnetism they will not be subject to galvanic or electric influences.

The mode of procedure and the apparatus which have been practiced with success in making the said pipes will now be fully described to enable others to produce the said new manufacture, reference being had to the accompanying drawings, in which—

Figure 1 is a vertical section of the apparatus used. The other figures will be referred to hereinafter.

It is best to have the paper or other tissue from which a pipe or tube is to be made wound on a roller, *a*, placed in front of the inclined table *b*, leading to a kettle, *g*, containing the mastic, which is to be kept in a fluid or semi-fluid state by fire in a suitable furnace below. Any of the known bituminous mastics may be used, such as asphalt or coal-tar with earthy substances mixed therewith. At the sides of the kettle there are two standards, *n*, (one only shown in the drawings,) which are slotted to receive the journals of a cylinder, *c*, so that the lower part of its periphery, when it is rotated by a crank-handle on its shaft or by other suitable means, shall run in the liquid mastic. The end of the sheet of paper or other tissue is drawn from the roller *a* along over the inclined table *b* and applied to the periphery of the cylinder *c*, to which it will stick by reason of the surface being coated with the mastic, and as the cylinder is rotated the paper or other tissue is thereby carried into and out of the liquid mastic and the outer surface thereof thoroughly coated. The mandrel *k* on which the tube or pipe is to be formed, is best made of metal. Its journals are fitted to the slots in the standard *n*, and are free to turn and slide up and down, so that its periphery shall bear on that of the cylinder *c*. To prevent the tube or pipe which is to be formed from adhering to the surface of this mandrel *k*, it should be covered with a sleeve made of paper in the form of a tube (see Figs. 3, 4, and 5) and made to fit it snugly. To facilitate the putting on of this sleeve, a cone may be used in the same manner as cylindrical wicks are slipped on to the wick holders of lamps, and to prevent this sleeve from becoming cemented to the surface of the mandrel by dripping mastic, care should be taken to grease or oil the surface of the mandrel before putting on the sleeve. So soon as the end of the sheet of paper or other tissue, by the rotation of the cylinder, reaches the mandrel, it must be detached from the surface of the cylinder by any suitable instrument and pressed to the surface of the sleeve on the mandrel, to which it will readily adhere by reason of the coating of mastic on its outer surface. The operation being thus started, by continuing to turn the cylinder *c* and the mandrel in opposite directions, but so that the peripheries in contact will move with equal velocities, the sheet of paper or other tissue will be drawn from the roller *a*, carried through and coated with mastic in the kettle, and thus coated will be rolled up on the mandrel, and the successive windings with interposed mastic pressed, and the surplus mastic pressed out by the weight of the mandrel resting on the periphery of the cylinder. As soon as the required thickness is obtained, the mandrel is lifted off, which may be done by pulling a chain, *m*, on one end of a lever, *l*, the other end of which is provided with rods *h*, having hooks at their lower ends which take hold of the journals. The mandrel is then transferred to a smooth table, B, made of stone, brick, or other suitable material, and covered with fine sand, and by two men taking hold of the end journals it is rolled back and forth over the table until a sufficient quantity of sand becomes embedded into the outer coating of mastic and the surface is rendered smooth and cylindrical. It is then again transferred to the cylinder *c* to receive from the periphery thereof another coating of mastic; but as it is desirable that this last coating of mastic should be of equal thickness, a cog-wheel, *p*, (represented separately in Fig. 8,) is mounted on the shaft of the cylinder *c*, and its cogs are engaged by the cogs of a pinion, *o*, (see Fig. 2,) on the shaft of the mandrel, and the cylinder is thereby turned. The wheel *p* has a segment without cogs, so that the length of the cogged sector determines the number of revolutions to be given to the cylinder. As soon as the cogless sector of the wheel *p* reaches the pinion *o*, the outer coating is completed and the cylinder will stop. The mandrel, with the tube or pipe thereon, is again lifted from the cylinder *c* and transferred to the table B, and there rolled a second time to force sand into this last coating of mastic. After the above operation, the mastic coating is permitted to cool, which may be accelerated by a shower of cold water, and after the formed tube or pipe is cooled the mandrel can be taken out by simply standing it on end and giving it a few knocks. Until the several coatings of mastic become thoroughly dry the tube or pipe thus formed is liable to get out of shape, and to prevent this, when the iron mandrel is taken out, all that is necessary is to insert a wooden mandrel. After the mastic has become dry and indurated, the paper sleeve may be removed by means of a metallic brush or other suitable instrument, and afterward the inside of the pipe may be coated with bituminous mastic or other water-proof mastic or cement by standing it up on end with the lower end closed and pouring in the liquid mastic or cement, and then turning it over and pouring out the surplus mastic, leaving the whole inner surface thoroughly covered with a coating impermeable to air or water.

Instead of the inner coating of mastic a thin tube made of glass or earthen ware may be put upon the mandrel, and by the process above described covered with paper, or other tissue, wound upon it with mastic by the process above described.

A method of connecting such tubes together is represented in Figs. 10, 11, and 12. Into the ends of two tubes to be united together is fitted a short pipe, *r*, made of zinc or other suitable metal; and which is provided with a number of arms, *s*, which are bent as shown in Fig. 10. The whole is then covered with a sleeve, *t*, made in the manner above described, and finally bituminous mastic in the liquid state is poured in through a hole at *u*, and fills the whole space between the tubes and the sleeve *t*, so that when the mastic sets it constitutes a strong, durable, and impermeable connection.

For laying down and connecting main pipes of a great diameter another plan may be adopted, as shown in Figs. 17 and 18. It consists in arranging two sets of tubes, one set within the other, and breaking joints, as represented, so that the joints of the inner tubes, *x*, shall be covered over by the outer tubes, *y*. Sufficient space is left between the inner and the outer tubes to receive liquid bituminous mastic, which is poured through holes *u* in the outer tubes, *y*, to fill the whole space *z* between the two sets of tubes, so that when this mastic solidifies it forms the bond to unite the two sets of tubes. The tapping may be effected in the manner represented in Figs. 13, 14, and 15 of the drawings. After boring a hole of suitable size in the main tube, a short pipe, *x'*, Fig. 15, made of vulcanized india-rubber, is formed with flanges at both ends and inserted into the said hole, which can be done by reason of the compressible nature of that substance, and after it is inserted by its elastic property it will expand and clasp the thickness of the pipe *v*. A suitable collar is then placed over the tube, and a faucet screwed tightly into it and into the india-rubber pipe *x'*.

In forming knee-jointed connections, as represented in Fig. 16, the ends of the two tubes 2 and 3 are inserted into the enlarged ends of a knee-jointed pipe, 1, and the spaces 4 filled with bituminous mastic. The edges of the tubes may also be embedded into concentric grooves formed for that purpose in the ends of the elbow-pipe.

We do not mean to be understood as making claim, broadly, to a manufacture of pipes or tubes of bituminous mastic and textile substances, as we are aware that prior to the said invention of the said JALOUREAU it has been proposed to make pipes of previously-formed sheets or boards composed of asphalt or bitumen with or without a coating of textile substance, and bending such sheets or boards around a core and uniting the edges.

What is claimed as the invention of the said ALFRED FAUVIN JALOUREAU, and desired to be secured by Letters Patent, is—

The new manufacture of pipes or tubes composed of several thicknesses of paper or other tissue, rolled up, and the several thicknesses or winnings united by interposed bituminous mastic, substantially as described.

THURLOW WEED.
PHILO S. SHELTON.

Witnesses as to Thurlow Weed:
B. W. GRISWOLD,
SAML. BEATCHFORD.

Witnesses as to Philo S. Shelton:
JOHN AYRES,